Z. S. RANDLEMAN.
BALING PRESS.
APPLICATION FILED DEC. 6, 1911.
1,045,184.   Patented Nov. 26, 1912.
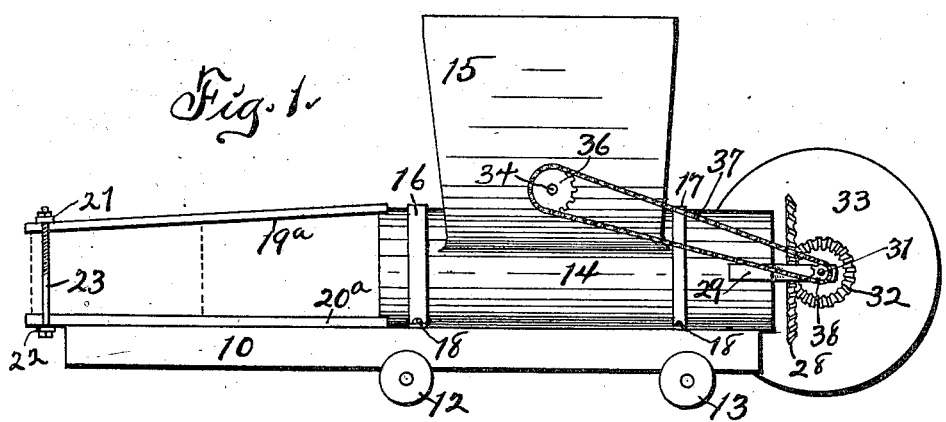
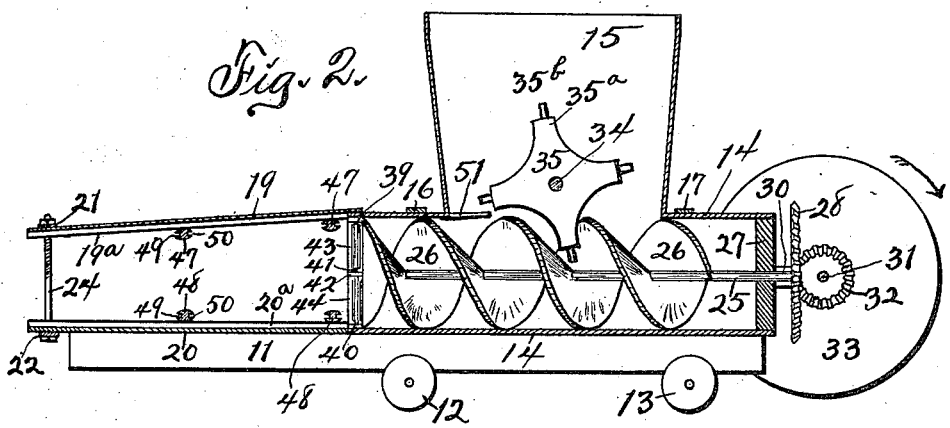
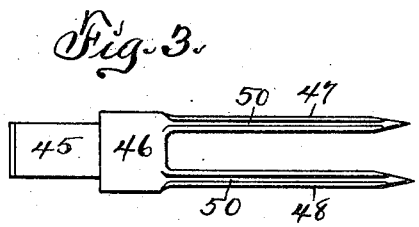
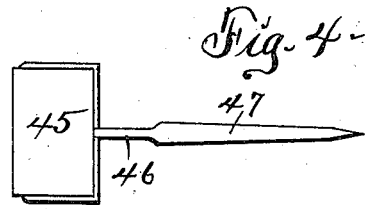

UNITED STATES PATENT OFFICE.

ZOUAVE S. RANDLEMAN, OF DES MOINES, IOWA.

BALING-PRESS.

1,045,184.  Specification of Letters Patent.  Patented Nov. 26, 1912.

Application filed December 6, 1911. Serial No. 664,683.

*To all whom it may concern:*

Be it known that I, ZOUAVE S. RANDLEMAN, citizen of the United States of America, and resident of Des Moines, Polk county, Iowa, have invented a new and useful Baling-Press, of which the following is a specification.

The object of this invention is to provide an improved construction for presses adapted for the baling of hay, straw and other substances of similar nature.

A further object of this invention is to provide improved feeding and compressing mechanism in a baling press.

A further object of this invention is to provide improved means adapted to facilitate the tying of bales in a baling press.

My invention consists in the construction, arrangement and combination of elements hereinafter set forth, pointed out in my claims and illustrated by the accompanying drawing, in which—

Figure 1 is a side elevation of the complete machine. Fig. 2 is a longitudinal vertical section of the same. Fig. 3 is a side elevation of a fork employed with the press and adapted to facilitate the placing of baling wires through the compressed substance. Fig. 4 is a plan of the same.

In the construction of the machine as shown the numerals 10, 11 designate longitudinal sills which are mounted on, secured to and carried by caster trucks 12, 13. A cylindrical casing 14, preferably of sheet metal, is mounted on the forward portion of and occupies approximately one-half the length of the sills 10, 11 and a hopper 15, which may be of the same material, is mounted on and communicates at its lower portion with the casing 14. Bands 16, 17, preferably of strap metal, encircle the cylindrical casing 14 adjacent its ends and said bands are secured at their ends to the sills 10, 11 as by screws 18. A baling box is mounted on the rear portion of the sills 10, 11 and forms a continuation of the cylindrical casing 14, with which it communicates at its forward end. The baling box is open at its ends and sides and comprises a top plate 19 and bottom plate 20. The bottom plate 20 is mounted on and secured to the sills 10, 11, and the top plate is fixed at its forward end to the rear end of the top of the casing 14. The top plate 19 is formed with downturned marginal flanges 19ª on its sides, and the bottom plate 20 is formed with upturned marginal flanges 20ª on its sides, and said flanges partially inclose the sides of the baling box. A cross-bar 21 is mounted above and adjacent the rear end of the top plate 19 and a cross-bar 22 is mounted below and adjacent the rear end of the bottom plate 20 and said cross-bars project at their ends beyond the sides of the baling box and are apertured. Bolts 23, 24 are mounted in vertical positions through the apertured end portions of the cross-bars 21, 22 and are threaded and provided with nuts at their upper ends. The nuts are adapted to be tightened on the bolts 23, 24 to depress the rear end portion of the top plate 19 and incline it toward the bottom plate 20, thus restricting the rear portion of the baling box as to one dimension. The inclination of the top plate 19 may be adjusted as desired, and is exaggerated in the drawing for clearness of illustration. A horizontal shaft 25 is mounted centrally of and extends lengthwise through the cylindrical casing 14 and said shaft carries a screw 26 which is rigidly fixed thereto. The screw 26 extends practically the entire length of the casing 14 and is of such diameter as to fit snugly to the side walls thereof. The screw shaft 25 extends through and is journaled in the front wall 27 of the casing 14 and a bevel gear 28 is fixed to the outer end of said shaft. Brackets 29, 30 are fixed to and project forwardly from opposite sides of the front end of the casing 14 and a shaft 31 is mounted for rotation in bearings in the end portions of said brackets and is disposed at right angles to and in the same horizontal plane with the shaft 25. A bevel gear 32 is fixed to the shaft 31 between the brackets 29, 30 and meshes with and is adapted to drive the bevel gear 28 on the screw shaft. A belt wheel 33 is fixed to one end of the shaft 31, outside the bracket 30, and said wheel is adapted to be connected by belting to a prime mover (not shown). A shaft 34 is mounted transversely of the lower portion of the hopper 15 and is journaled for rotation in the side walls of said hopper. A feeder wheel 35 is fixed to the shaft 34 within the hopper 15. A sprocket wheel 36 is fixed to one end of the shaft 34 outside the hopper and is connected by a sprocket chain 37 to a sprocket wheel 38 on the end of the shaft 31 opposite to the belt wheel 33. Thus the feeder wheel 35 and screw 26 are adapted to be driven conjunctively by the same means.

The feeder wheel 35 has such width of face as to fill a considerable portion of the width of the lower end of the hopper 15, and said feeder wheel is of irregular or wiper shape, being formed with four radial arms 35ª equally spaced apart on its periphery. The ends of the arms 35ª project below the uppermost point of the screw 26 and between the threads thereof, and said screw and the feeder wheel are timed in their rotation so that the arms 35ª will not interfere with said screw by contact with its threads. Bearings 39, 40 are formed on and project longitudinally from diametrically opposite points of the periphery of the rear end of the screw 26 and a spindle 41 is mounted in said bearings and in a central bearing 42 on the rear end of the screw shaft 25. Rollers 43, 44 are mounted for rotation on the spindle 41 on opposite sides of the central bearing 42 and extend radially from the shaft 25. The rollers 43, 44 are adapted to be rotated in opposite directions during the operation of the machine by contact with the substance being compressed, and by such contact to smooth and assist in compressing such substance.

In practical use the machine is positioned by draft applied in any suitable manner thereto for the purpose of moving the press on the caster trucks 12, 13 to desired location. For instance, the machine may be placed at the discharge end of the straw carrier of a separator, and the straw be baled as fast as the grain is separated. Power is applied through the belt wheel 33 and bevel gears 32 and 28 to drive the screw shaft 25 and endless screw thereon. Substance to be baled, such as straw or hay, is fed into the mouth of the hopper 15, and such substance is engaged by the arms 35ª of the feeder wheel and carried downward in successive quantities into engagement with the threads of the driven screw 26. Continued rotation of the screw shaft 25 causes the substance to be carried rearwardly of the cylindrical casing 14 by the revolution of the screw 26, and to be forced out into the baling box with which said casing communicates. The substance is compressed by the action of the screw and of the rollers 43, 44 between the top and bottom plates of the baling box, and is choked by reason of the inclined position of said top plate. Successive quantities of the substance are thus forced into the baling box and through said box until they approach the rear portion thereof and reach the vertical plane bounded by the bolts 23, 24. At this time it is desirable to tie or bale the substance already compressed, and to this end baling wires, (not shown) are placed in spaced relations between the rear end of the compressed substance and the bolts 23, 24.

To facilitate the tying operation I have provided a fork, two of which are to be used with one machine. The forks are illustrated in Figs. 3 and 4 and are shown in section in Fig. 2. The fork preferably comprises a head block 45, a flat neck portion 46 fixed thereto, and tines 47, 48 projecting from said neck portion in spaced relations. The tines 47, 48 are attenuated at their ends and are formed with grooves 49, 50 in their lateral sides and opening to both ends of said tines. In practical use of the fork as described it is inserted in the compressed substance at a distance from the bolts 23, 24 corresponding to the length of the bale desired. This insertion may be accomplished by blows of a mallet on the head 45, the attenuated tines penetrating the compressed substance without difficulty. I prefer to make the baling box approximately equal to the length of two ordinary bales, and the position of the fork therein is approximately at its midlength, as shown in Fig. 2 and indicated by dotted line in Fig. 1. The ends of the baling wires already placed adjacent the bolts 23, 24 are now brought to one end or the other of the fork so placed and are inserted in the grooves 49 of the tines 47, 48 respectively, said grooves opening to the rear, and are pushed through said grooves to the other side of the press. The ends of the respective baling wires are then brought together at one side of the bale and are secured in any desired manner, as by twisting. Other baling wires are then introduced in the opposite or forwardly opening grooves 50 of the fork and a second fork is driven through the compressed substance and transversely of the baling box, at a point near the initial end thereof, as shown in Fig. 2. The wires which have been inserted through the grooves 50 of the first fork are then inserted through the rear grooves 49 of the second fork and tied as before, thus completing the second bale. The grooves 49, 50 of the forks thus provide convenient guides by means of which the baling wires may be introduced through the compressed substance.

In continued operation of the machine the bale first formed is gradually forced out at the rear end of the baling box and between the bolts 23, 24. The first fork may be removed at any time after the second bale is tied, and later be inserted ahead of the second fork for the tying of a third bale. This operation is continued until the substance has all been forced into the baling box, each fork being successively inserted, removed and replaced as the operation continues and as successive bales are tied. After the machine has once been put into operation it is desirable always to leave one bale in the baling box to serve as an abutment for the compression of the next succeeding bale, and this desirability is added to by the difficulty of removing the last bale when the substance being compressed is exhausted at a given "job".

Rake teeth 51 may be fixed to the upper portion of the casing 14 and extend across the mouth of the hopper 15 toward the feeder wheel 35. Rake teeth 35$^b$ may be formed on the extremities of the arms of the feeder wheel 35 and intersect the plane of the rake teeth 51 in rotation of said wheel, said teeth being arranged in staggered relations to the teeth 51. It is the function of the teeth 51 to prevent upward movement of the substance being baled at the rear of the feeder wheel, and to disengage such substance from the teeth 35$^b$ and arms 35$^a$ of said feeder wheel. The teeth 51 also serve as a partial floor at the rear of the feeder wheel and prevent substance from falling upon and clogging the endless screw behind said feeder wheel.

I claim as my invention—

1. A baling press, comprising a cylindrical casing, a baling box communicating with one end of said casing, a screw mounted for rotation within and filling said casing, rollers journaled on and arranged transversely of the delivery end of said screw, and means for driving said screw.

2. A baling press, comprising a cylindrical casing, a baling box communicating with one end of said casing, a hopper mounted on and communicating with said casing, teeth extending into the lower portion of said hopper, a screw mounted for rotation within said casing, a feeder wheel mounted for rotation in the lower portion of said hopper, teeth on said wheel in staggered relations with the first teeth, and adapted to pass between them, and means for driving said screw and feeder wheel conjunctively.

3. A baling press, comprising a truck frame, a cylindrical casing mounted thereon, a hopper mounted on and communicating with said casing, a baling box mounted on said truck frame and communicating with one end of said casing, a screw mounted for rotation in and fitted to said casing and directed toward said baling box, a feeder wheel mounted for rotation in the lower portion of said hopper, said feeder wheel formed with radial arms intersecting the orbit of said screw, teeth transversely of said hopper at one side of said wheel, teeth on the arms of said wheel and arranged in staggered relations with and adapted to pass between the first teeth, and means for driving said screw and feeder wheel conjunctively.

4. A baling press, comprising a frame, a cylindrical casing mounted thereon, a hopper mounted on and communicating with said casing, a baling box mounted on said frame and communicating with one end of said casing, a screw shaft mounted for rotation and extending longitudinally of said casing, a screw on said shaft and fitted to said casing, rollers journaled on and arranged transversely of the delivery end of said screw a countershaft journaled for rotation in said frame at the forward end of said casing, and bevel gearing between said screw shaft and countershaft.

5. A baling press, comprising a frame, a cylindrical casing mounted thereon, a hopper mounted on and communicating with said casing, a baling box mounted on said frame and communicating with the rear end of said casing, a screw shaft mounted for rotation and extending longitudinally of said casing, a screw on said shaft and fitted to the interior of said casing, rollers journaled on and arranged transversely of the delivery end of said screw, a feeder wheel mounted for rotation in said hopper and formed with radial arms, a countershaft mounted for rotation at the forward end of said casing, a belt wheel on said countershaft, bevel gearing between said countershaft and screw shaft, and sprocket gearing between said countershaft and feeder wheel.

Signed by me at Des Moines, Iowa, this twenty-seventh day of March, 1911.

ZOUAVE S. RANDLEMAN.

Witnesses:
S. C. SWEET,
EARL M. SINCLAIR.